UNITED STATES PATENT OFFICE.

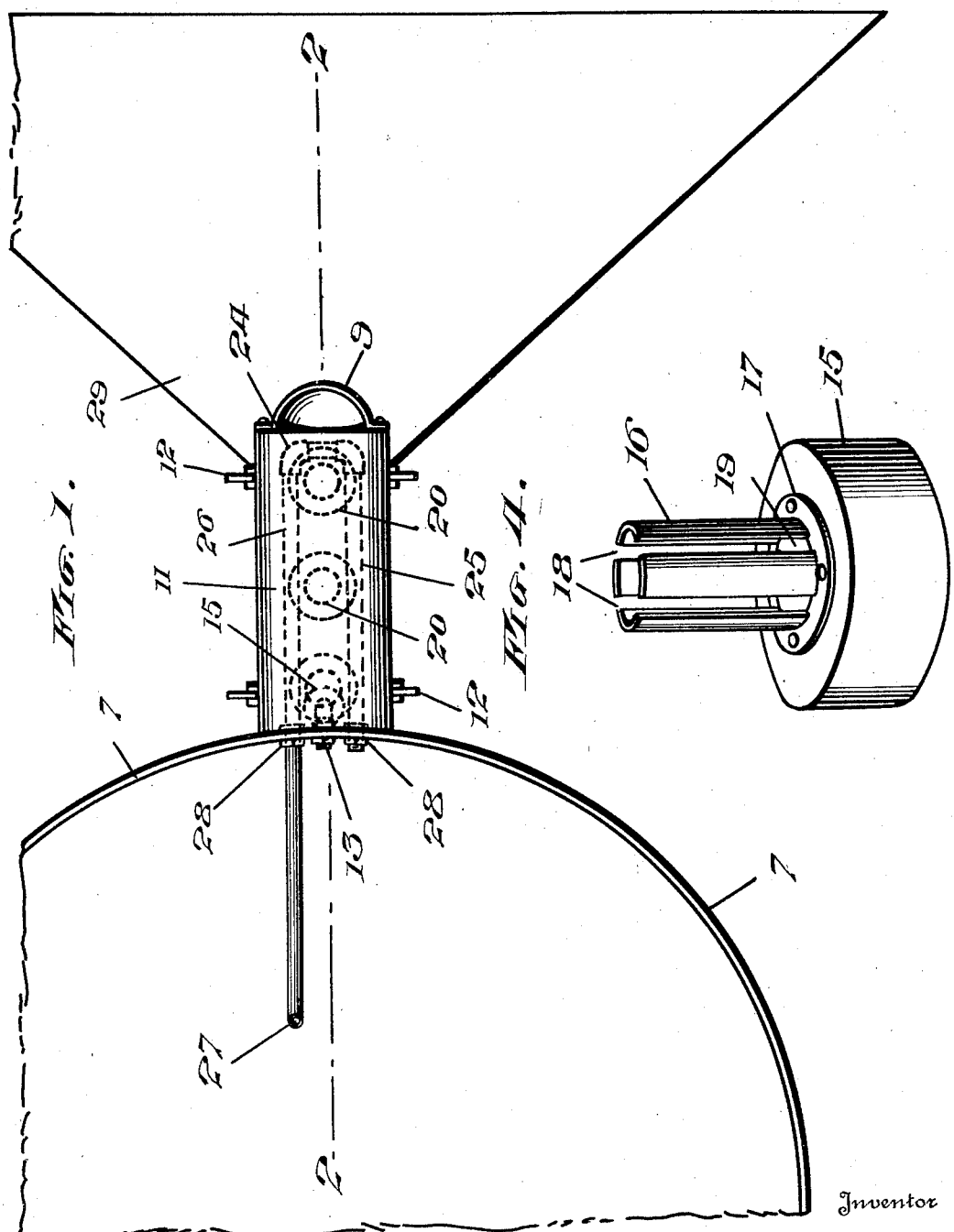

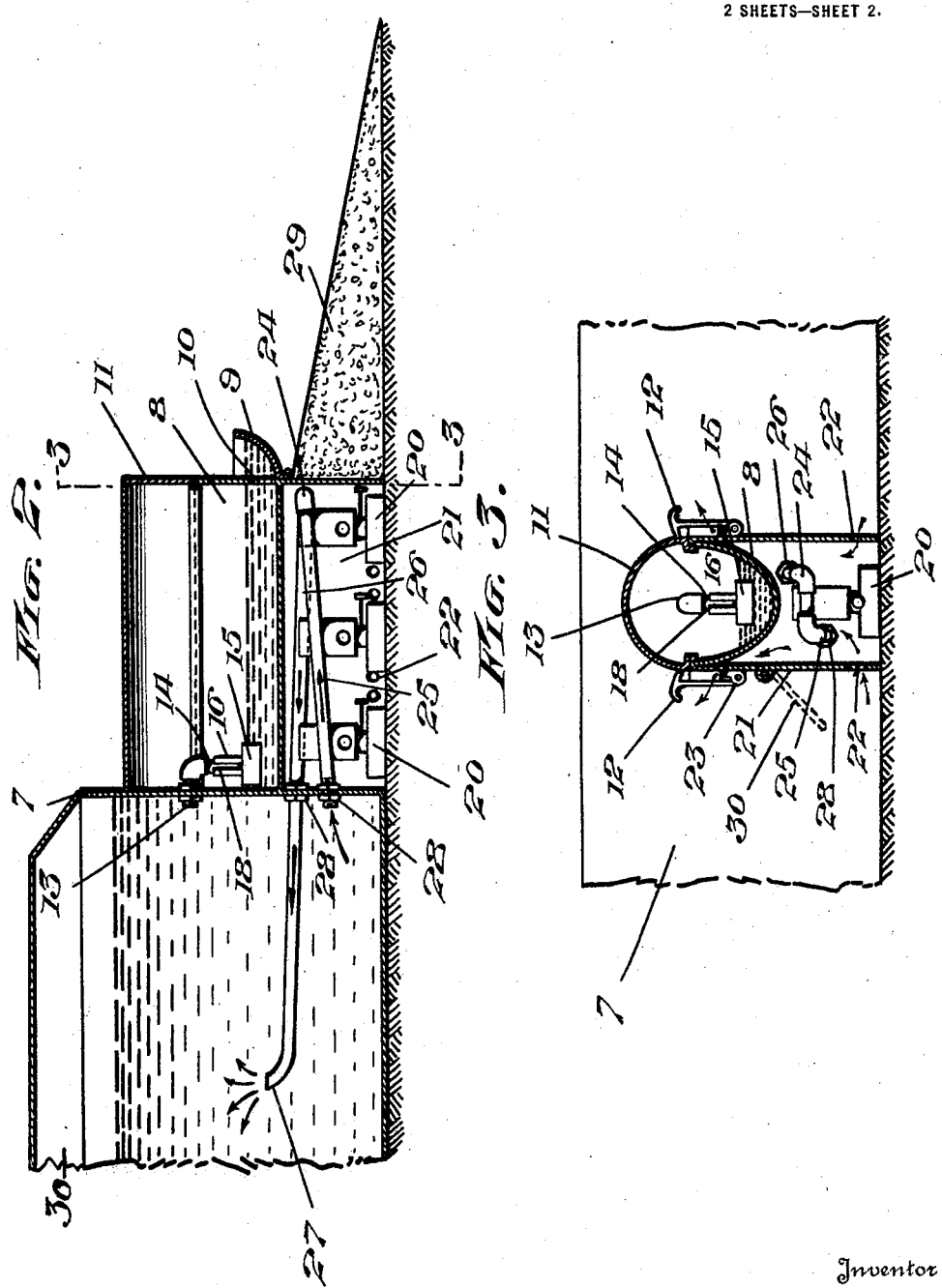

ALFRED N. MENARD, OF SALIX, IOWA.

WATER-TROUGH.

1,400,449. Specification of Letters Patent. Patented Dec. 13, 1921.

Application filed March 23, 1921. Serial No. 454,648.

*To all whom it may concern:*

Be it known that I, ALFRED N. MENARD, a citizen of the United States, residing at Salix, in the county of Woodbury and State of Iowa, have invented certain new and useful Improvements in Water-Troughs; and I do hereby declare the following to be a full, clear, and exact description of the invention, such as will enable others skilled in the art to which it appertains to make and use the same.

The present invention relates to water troughs for animals, and aims to provide a novel and improved device of that character having means whereby hogs and smaller animals can obtain water, as well as cattle and other stock.

A further object is the provision of such a device of such construction that the water in the secondary trough can be heated during cold weather, and means also being provided for the heating of the water in the main trough or tank.

The invention also has for an object the provision of a novel device for attachment to the wall of a main trough or tank, for supplying hogs and other smaller animals with water, and for heating the water during the winter.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawings, wherein:—

Figure 1 is a plan view of the device.

Fig. 2 is a vertical longitudinal section on the line 2—2 of Fig. 1, showing the cover for the main tank.

Fig. 3 is a cross section on the line 3—3 of Fig. 2.

Fig. 4 is an enlarged perspective view of the float valve.

The device is used with a main drinking trough or tank 7, which may be of any suitable shape, and the device is attached to the wall of said tank at one side thereof. The attachment includes a secondary trough 8 extending from the tank 7, with the inner end of the trough secured in any suitable manner to the wall of said tank. The outer end of the trough 8 is provided with a drinking spout 9 for hogs and other smaller animals, and said outer end of the trough 8 has an opening 10 below the horizontal plane of the rim of said spout 9, for the flow of water from said trough into the spout. A suitable cover 11 is fitted on the rim of the trough 8 and is held removably in place by means of suitable catches 12. The cover 11 can be removed, if desired, so that animals can drink from the trough 8.

The water is supplied from the tank 7 to the trough 8 through the pipe 13 secured through the wall of the tank 7 at the inner end of the trough 8, and having a depending delivery terminal 14. A float 15 of hollow sheet metal or other suitable material is disposed within the trough under the pipe 13, and has an upstanding guide sleeve 16 which has a flange 17 at its lower end secured on said float. The sleeve 16 fits telescopically on the depending terminal 14 of the pipe 13, to guide the float for the vertical movement, and said sleeve has vertical slots 18 through which the water can flow from said pipe 13 when the float is lowered. A valve disk 19 of rubber, cork or other suitable material is disposed on the float 15 within the lower end of the sleeve 16, to bear upwardly against the terminal 14 of the pipe 13 when the float is raised, thereby shutting off the flow of water through said pipe into the trough. Consequently, the trough 8 is kept filled with water up to the predetermined level, and when the water level lowers, the float 13 in dropping will permit the water to enter the trough until the normal level is restored. By removing the cover 11, access is had to the float.

In order to heat the water in the trough 18, oil lamps 20 or other suitable heaters are disposed under the bottom of the trough and are arranged in a longitudinal row, as shown. These heaters are inclosed by a housing or casing 21 having the upper edges of its sides united with the upper longitudinal edges of the trough 8, as seen in Fig. 3, and the inner ends of said sides are attached to the wall of the tank 7, while the outer end of said housing is united with the outer end of said trough 8. One side of the housing can have the door 30 to swing open for access to the lamps or heaters 20. The sides of the housing have air inlet openings 22 near the lower edges thereof for the entrance of fresh air, and said sides have outlet openings 23 at the opposite sides of the trough and near the upper edges of said sides for the escape of the products of combustion from the heaters. The heated air and gas in rising from the heaters 20 will contact with the bottom of the trough and flow upwardly along the opposite sides of the trough 8, and out through the openings 23, thereby heating the water in said trough.

The lamps or heaters 20 also serve to heat the water in the main tank or trough 7. For this purpose, a looped or single coil pipe 24 is disposed in the housing 21 with its terminal portions extending through the wall of the tank 7. Said pipe 24 has an inclined portion 25 with its lower terminal engaging through the wall of the tank 7, and said pipe has an opposite inclined portion 26 leading in the opposite direction from the upper end of the portion 25 and extending through the wall of said tank. The portions 25 and 26 are disposed at the opposite sides of the lamps or heaters 20 whereby the loop or coil will surround the heaters to be heated thereby, and the portion 26 projects for a distance into the tank 7, and its terminal is turned upwardly, as at 27. The pipe 24 thus rises at an angle from its lower end which communicates with the tank 7 near the bottom thereof, and said pipe passes around the heaters within the casing 21 and then reënters the tank 7. This will provide for the flow of the cool water from the lower portion of the tank 7 into the pipe 24, and the water being heated therein will rise and pass out through the terminal 27 upwardly into the tank 7. The portions 25 and 26 of the pipe 24 are secured to the wall of the tank 7 by means of nuts 28, or the like, to secure said pipe in place, and to also prevent leakage.

It is preferable to provide a concrete approach 29 leading to the spout 9, whereby the hogs and other smaller animals are enabled to drink from said spout.

The main tank 7 is also preferably provided with a cover 30 for use during the night time, to keep the cold air from the water and to retain the heat in the tank.

Having thus described the invention, what is claimed as new is:—

1. In a water trough structure, the combination of a main tank, a secondary trough supplied with water from the main tank, a heater under said trough for heating it, and a pipe for the flow of water from the tank adjacent to said heater under said trough and back into said tank.

2. In a water trough structure, the combination of a main tank, a secondary trough, a heater under said trough, and a water pipe passing around said heater under said trough and having its opposite terminals opening into said tank for the passage of water through said pipe to be heated by said heater.

3. In a water trough structure, the combination of a main tank, a secondary trough at one side thereof, a heater under said trough, and a looped pipe extending around said heater under said trough and through the wall of the tank, the pipe being inclined from its receiving end for the flow of water from said tank through the pipe and back into the tank.

4. In a water trough structure, the combination of a main tank, a secondary trough at one side of the tank supplied with water from said tank, a heater under said trough, a housing inclosing said heater and having means for the inlet of air near the bottom and for the outlet of the products of combustion after passing the sides of the trough, and a looped pipe within said housing extending around said heater under said trough and through the wall of the tank with its terminals opening into said tank, said pipe being inclined from one terminal for the upward flow of water therethrough from and back into said tank.

5. In a water trough structure, the combination of a main tank, a secondary trough, heating means under the secondary trough, and means for the circulation of water from the main tank adjacent to said means under said trough to be heated thereby and to return to said tank.

In testimony whereof I have signed my name to this specification in the presence of two subscribing witnesses.

ALFRED N. MENARD.

Witnesses:
H. B. LOWE,
A. J. GRANGER.